United States Patent [19]

Kato

[11] Patent Number: 4,484,669
[45] Date of Patent: Nov. 27, 1984

[54] HYDRAULIC DAMPER

[75] Inventor: Tetsuo Kato, Kanagawa, Japan

[73] Assignee: Tokico Ltd., Kanagawa, Japan

[21] Appl. No.: 370,261

[22] Filed: Apr. 20, 1982

[30] Foreign Application Priority Data

Apr. 25, 1981 [JP] Japan ............................ 56-59990[U]

[51] Int. Cl.³ .............................................. F16F 9/48
[52] U.S. Cl. .................................... 188/282; 188/317;
188/322.15; 137/513.3
[58] Field of Search ................... 188/282, 317, 322.15,
188/315; 137/513.3

[56] References Cited

U.S. PATENT DOCUMENTS

| 2,346,275 | 4/1944 | Read et al. | 188/315 |
| 2,670,814 | 3/1954 | Ball | 188/317 X |
| 4,203,507 | 5/1980 | Tomita et al. | 188/317 |

FOREIGN PATENT DOCUMENTS 55-82539  6/1980  Japan .
987111  3/1965  United Kingdom .

*Primary Examiner*—Bruce H. Stoner, Jr.
*Assistant Examiner*—Michael P. Gilday
*Attorney, Agent, or Firm*—Wenderoth, Lind & Ponack

[57] ABSTRACT

A hydraulic damper includes a cylinder, a piston working in the cylinder and partitioning the interior thereof into two liquid chambers, two valve discs provided respectively on opposite end surfaces of the piston, two sets of passages opening respectively in opposite end surfaces of the piston to cooperate with respective valve discs, and an orifice communicating permanently the two liquid chambers. A restricting member is provided to change the effective area of the orifice in response to the direction of the liquid flow passing through the orifice.

1 Claim, 6 Drawing Figures

HYDRAULIC DAMPER

BACKGROUND OF THE INVENTION

This invention relates to hydraulic dampers and, particularly to hydraulic dampers of the kind comprising a cylinder containing therein hydraulic fluid, a piston working in the cylinder and partitioning the interior thereof into two liquid chambers, a piston rod secured to the piston and extending through one of the liquid chambers to the outside, and two valve discs provided respectively on opposite surfaces of the piston for generating a damping force in the extension and contraction strokes of the damper respectively.

Conventionally, there is provided in the hydraulic damper of the kind aforementioned a fixed orifice for permanently connecting the two liquid chambers, thereby maintaining the valve discs in the closed condition when the reciprocating velocity of the piston is low. The orifice generates a predetermined damping force both in the extension and contraction strokes and, defines a rising portion in damping force-velocity characteristics of the damper. The effective area of the orifice is the same between the extension and contraction strokes of the damper, and thus it is not possible to change the damping force between the extension and contraction strokes when the piston velocity is low. However, when it is desired to change the damping force between the extension and contraction strokes, it is not sufficient to change only the characteristics of the valve discs, and it is necessary also to change the characteristics of the orifice between the extension and contraction strokes of the damper.

Japanese Utility Model Disclosure (Kokai) No. 55-82539 discloses a hydraulic damper of the kind aforementioned. An orifice and a non-return valve are provided in connection with each of the valve discs, and the non-return valve acts to prevent the fluid flow in the direction closing the corresponding valve disc. Thus, the effective area of respective orifices can be changed with respect to the fluid flow passing through the piston. The damper operates satisfactorily but the construction thereof is complicated.

SUMMARY OF THE INVENTION

One of the objects of the invention is to provide a hydraulic damper having different damping force characteristics between the extension and contraction strokes of the damper and being simple in construction.

According to the invention, there is provided, in the hydraulic damper of the kind aforementioned, an orifice communicating permanently the two chambers, and a restricting member for changing the effective area of the orifice in response to the direction of the fluid flow passing through the orifice.

BRIEF DESCRIPTION OF THE DRAWINGS

Further objects and advantages of the invention will be clarified from the following description taken in conjunction with accompanying drawings illustrating preferred embodiments of the invention, and in which.

DETAILED DESCRIPTION OF THE PREFERRED EMBODIMENTS

Figure 1:
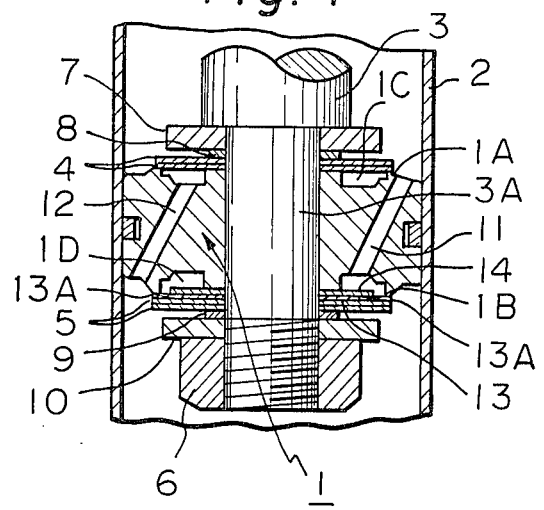
FIG. 1 is a partial sectional view showing the essential portion of a hydraulic damper according to the invention.

In FIG. 1, a piston 1 is slidably provided in a cylinder 2 and partitions the interior of the cylinder 2 into upper and lower chambers. The piston 1 is secured to a reduced diameter lower end 3A of a piston rod 3, and the upper end (not shown) of the piston rod 3 passes through the upper end (not shown) of the cylinder 2 to the outside. The piston 1 moves upward as seen in FIG. 1 in the extension stroke of the damper and moves downward in the contraction stroke of the damper. Annular valve discs 4 and 5 are respectively provided on the upper and lower surfaces 1A and 1B of the piston 1. Each of the valve discs 4 and 5 consists of two mutually overlapping thin plates, with the inner end thereof being secured to the piston rod 3 by a nut 6. Shown at 7, 8, 9 and 10 are spacers respectively. Passages 11 and 12 open respectively in the upper and lower surfaces 1A and 1B of the piston 1. The passages 11 (only one is shown in FIG. 1) are connected with an annular recess 1D in the piston 1 and transmit the pressure in the upper chamber in the extension stroke of the damper to the valve disc 5. The passages 12 (only one is shown in FIG. 1) are connected with an annular recess 1C in the piston 1 and transmit the pressure in the lower chamber in the contraction stroke of the damper to the valve disc 4.

Figure 2:
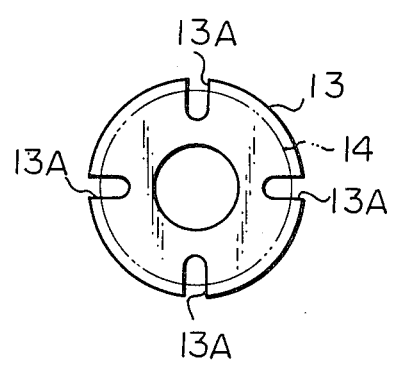
FIG. 2 is a plan view showing the relationship between an annular plate and a flexible member in the hydraulic damper of FIG. 1.

An annular orifice plate 13 is interposed between the lower surface 1B of the piston 1 and the valve disc 5. The orifice plate 13 has in the outer circumferential portion thereof a plurality of cut-out portions 13A as shown in FIG. 2 to constitute an orifice passage connecting permanently the upper and lower chambers. According to the invention, an annular restricting member 14 is overlappingly disposed on the orifice member 13, and the dimension, and the configuration of the orifice member 13 and the restricting member 14 are determined such that the restricting member 14 partially covers the cut-out portions 13A in the normal condition as shown in FIG. 2. When the hydraulic fluid flows from the upper chamber to the lower chamber, the restricting member engages with the orifice member 13 so as to minimize the effective area of the orifice passage, and when the fluid flows in the opposite direction the outer circumference of the restricting member 14 easily separates from the orifice member thereby increasing the effective area of the orifice passage.

In operation, the piston 1 moves upward in FIG. 1 in the extension stroke of the damper, and when the velocity of the piston 1 is low, the fluid in the upper chamber flows into the lower chamber through the passages 11 and cut-out portions 13A. The restricting member 14 closes a part of cut-out portions 13A, and thus the effective area of the cut-out portions 13A is small and the damping force-velocity characteristics at that condition are depicted by line $b_3$ in FIG. 3 having a large angle of inclination $\beta$. When the velocity of the piston 1 increases further, the outer circumferential portion of the valve disc 5 deflects downward and the damping force at this stage is shown by line $b_2$ in FIG. 3. It will be noted that the orifice plate 13 and the restricting member 14 also deflect downward together with the valve disc 5, but the rigidity of the plate 13 and the member 14 against the deflection is usually very small as compared with that of the valve disc 5 so that the line $b_2$ is substantially determined by the valve disc 5. However, the plate 13 and/or the member 14 may have a substantial rigidity to constitute a part of the valve disc 5 in determining the damping force.

Figure 3:
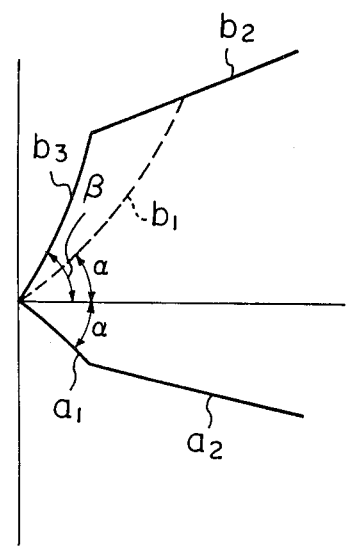
FIG. 3 is a diagram showing the relationship between the velocity of the piston and a damping force.

In the contraction stroke of the damper, the piston 1 moves downward in FIG. 1 and the valve disc 5 is in the closed condition. When the velocity of the piston 1 is low, the valve disc 4 does not open and the fluid in the lower chamber flows into the upper chamber through the cut-out portions 13A. The outer circumference of the restricting member 14 deflects upward due to the fluid flowing through the cut-out portions 13A. Thus, the effective area of the cut-out portions 13A increases as compared with the extension stroke, and the damping force caused therefrom is smaller than that in the extension stroke. The damping force is depicted by line $a_1$ in FIG. 3 which has a small inclination angle $\alpha$. When the velocity of the piston 1 exceeds a predetermined velocity, the outer circumference of the valve disc 4 deflects upward and the fluid in the lower chamber flows substantially through the passages 12 and into the upper chamber. The damping force at this condition is depicted by line $a_2$ in FIG. 3. Incidentally, the broken line $b_1$ in FIG. 3 depicts the damping force of typical prior art damper wherein the flexible member 14 is not provided.

Figure 4:
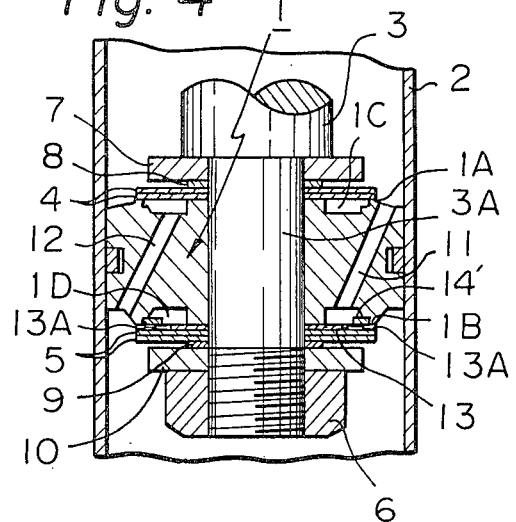
FIG. 4 is a view similar to FIG. 1 but showing a modified form.

FIG. 4 shows another embodiment of the invention wherein parts corresponding to the embodiment of FIG. 1 are denoted by the same reference numerals.

In FIG. 4, the outer circumference of an annular restricting member 14' is secured to the lower surface 1B of the piston 1 and the inner circumference thereof can deflect upwardly, thereby increasing the effective area of the orifice passage.

Figure 5:
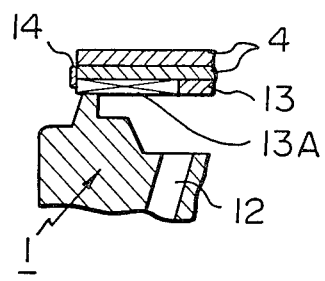
FIG. 5 is a partial view showing a further modified form.

FIG. 5 shows a further modified form wherein an annular restricting member 14" encircles the outer circumferences of the valve disc 4 and the orifice plate 13 and is secured to the valve disc 4. The member 14" partially covers the cut-out portions 13A in the orifice plate and is deflectable in the radially outward direction when the fluid flows in the contraction stroke of the damper, and maintains the condition shown in FIG. 4 when the fluid flows in the extension stroke of the damper. The damping force-velocity diagram of the embodiment of FIG. 5 is similar to FIG. 3, namely, in the extension stroke, the rising portion $b_3$ of the diagram has a steep inclination $\beta$ as compared with the rising portion $a_1$ of the damping force in the contraction stroke.

Figure 6:
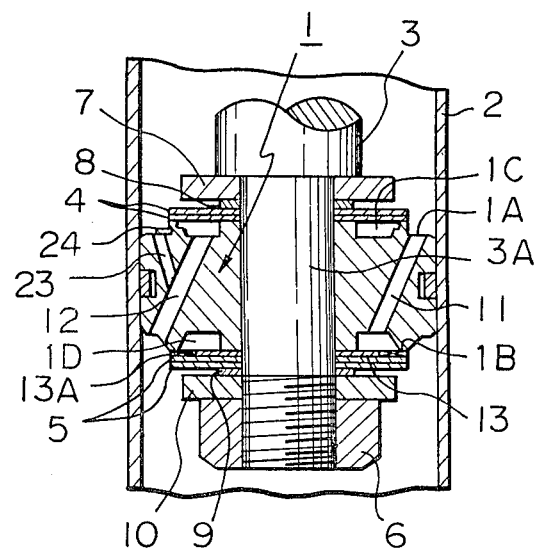
FIG. 6 is a view similar to FIG. 1 but showing a still further modified form.

FIG. 6 shows a still further modified form wherein an orifice plate 13 having a plurality of cut-out portions 13A is interposed between the lower surface 1B and the valve disc 5 and, further, an additional orifice passage 23 is formed between each or a selected number of passages 12 and the upper surface 1A of the piston 1 to constitute an orifice having a variable effective area. The upper ends of the orifice passages 23 are partially closed by a restricting member 24. The restricting member can deflect upward when fluid flows in the passage 23 in the upward direction. The restricting member 24 may fully close the passage 23 when the orifice plate 13 is provided. Alternatively, the orifice plate 13 may be omitted when the restricting member 24 partially covers the passage 23 in the closed condition. The operation and function of the embodiment of FIG. 6 is similar to FIG. 1.

Although the description has been made with respect to preferable embodiments, the invention is not limited to the such embodiments, and various changes or modifications can easily be performed by those skilled in the art. The restricting member is preferably formed of such as a rubber plate or the like having a good sealing characteristics in the closed condition and being easily deflectable when a relatively low pressure is applied in the opening direction. However, the restricting member may be formed of a rigid material and be lightly biased in the closing direction. In the illustrated embodiments, the restricting member acts to increase the effective area of the orifice passage in the contraction stroke of the damper, but the restricting member may be arranged to increase the effective area of the orifice passage in the extension stroke of the damper. Further, the invention may similarly be applied to a dual-tube type damper and a single tube type damper.

As described heretofore, the restricting member according to the invention decreases the effective area of an orifice passage against the fluid flow in one direction, or increases the effective area against the fluid flow in the opposite direction, and thus, it is possible to adjust or change the damping force in the low piston velocity condition between the extension and contraction strokes of the damper, thereby improving the applicability of the hydraulic damper.

Further, the damping force in the extension and contraction strokes of the damper can easily be adjusted by changing the size and/or the rigidity of the restricting member.

What is claimed is:

1. A hydraulic damper comprising:

a cylinder;

a piston slidably mounted in said cylinder for movement therein in opposite extension and contraction directions, said piston partitioning the interior of said cylinder into two liquid chambers;

first and second sets of passages extending through said piston and opening on opposite end surfaces of said piston;

first and second damping valve discs mounted on respective said end surfaces and cooperating respectively with said first and second passages to enable damping fluid flow through said first passages and to block fluid flow through said second passages upon movement of said piston in said extension direction, and to block fluid flow through said first passages and enable damping fluid flow through said second passages upon movement of said piston in said contraction direction;

orifice means for permanently communicating said two liquid chambers and defining damping means during low velocity movement of said piston in either of said directions, said orifice means comprising at least one opening formed in an annular plate forming a portion of one of said valve discs;

means for reducing the damping force through said orifice means upon movement of said piston in one said direction compared with the damping force through said orifice means upon movement of said piston in the other said direction, said damping force reducing means comprising a restricting member disposed contiguous to said annular plate and normally covering a portion of said opening, said restricting member being maintained in position covering said portion of said opening upon movement of said piston in said other direction, and said restricting member having a greater flexibility than said annular plate and being deflectable to uncover a further portion of said opening and thereby increase the size of said orifice means upon movement of said piston in said one direction; and said at least one opening comprising a plurality of cutouts in the outer peripheral portion of said annular plate, and said restricting member being connected to the outer circumference of said one valve disc and partially covering the outer circumference of said annular plate.

* * * * *